(12) United States Patent
Gan et al.

(10) Patent No.: US 11,934,070 B2
(45) Date of Patent: Mar. 19, 2024

(54) DISPLAY PANEL AND DISPLAY DEVICE

(71) Applicants: Hefei Xinsheng Optoelectronics Technology Co., Ltd., Anhui (CN); BOE TECHNOLOGY GROUP CO., LTD., Beijing (CN)

(72) Inventors: Quan Gan, Beijing (CN); Ya Yu, Beijing (CN); Feng Qu, Beijing (CN); Yongcan Wang, Beijing (CN); Fengzhen Lv, Beijing (CN); Xianjie Shao, Beijing (CN); Rui Ma, Beijing (CN)

(73) Assignees: Hefei Xinsheng Optoelectronics Technology Co., Ltd., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 259 days.

(21) Appl. No.: 17/600,162

(22) PCT Filed: Oct. 23, 2020

(86) PCT No.: PCT/CN2020/123216
§ 371 (c)(1),
(2) Date: Sep. 30, 2021

(87) PCT Pub. No.: WO2022/082720
PCT Pub. Date: Apr. 28, 2022

(65) Prior Publication Data
US 2022/0317497 A1    Oct. 6, 2022

(51) Int. Cl.
*G02F 1/1339* (2006.01)
*G02F 1/1335* (2006.01)

(52) U.S. Cl.
CPC .... *G02F 1/13394* (2013.01); *G02F 1/133512* (2013.01); *G02F 1/13396* (2021.01)

(58) Field of Classification Search
CPC ............... G02F 1/1339; G02F 1/13394; G02F 1/13396; G02F 1/1341
See application file for complete search history.

(56) References Cited

U.S. PATENT DOCUMENTS

2009/0237608 A1*  9/2009  Shen .................... G02F 1/13394
                                                        349/155
2010/0053536 A1*  3/2010  Sato ...................... G02F 1/1337
                                                        349/155

(Continued)

FOREIGN PATENT DOCUMENTS

CN    103984153 A    8/2014
CN    104216161 A    12/2014

(Continued)

*Primary Examiner* — Jonathan Y Jung
(74) *Attorney, Agent, or Firm* — HOUTTEMAN LAW LLC

(57) ABSTRACT

Disclosed is a display panel including: first spacer on the array substrate, an orthographic projection of the first spacer on the array substrate being a first pattern extending along a first direction; a second spacer on the counter substrate, an orthographic projection of the second spacer on the array substrate being a second pattern extending along a second direction; at least two third spacers, orthographic projections of which on the array substrate being respectively on two sides of the first pattern along the first direction; at least two fourth spacers, orthographic projections of which on the array substrate being respectively on two sides of the second pattern along the second direction; one of the third spacer and the fourth spacer is on the array substrate, and the other is on the counter substrate.

15 Claims, 8 Drawing Sheets

(56) References Cited

U.S. PATENT DOCUMENTS

2014/0293212 A1   10/2014  Osaki et al.
2016/0054536 A1*  2/2016  Long ...................... G02B 5/201
                                                                359/892
2017/0031195 A1*  2/2017  Chen ................ G02F 1/133512

FOREIGN PATENT DOCUMENTS

| CN | 106094359 A | 11/2016 |
|---|---|---|
| CN | 106802517 A | 6/2017 |

\* cited by examiner

PSG:

DISPLAY PANEL AND DISPLAY DEVICE

CROSS-REFERENCE TO RELATED APPLICATION

This is a National Phase Application filed under 35 U.S.C. 371 as a national stage of PCT/CN2020/123216, filed on Oct. 23, 2020, the contents of which are incorporated herein in their entirety by reference.

TECHNICAL FIELD

The present disclosure relates to the field of display technology, and particularly relates to a display panel and a display device.

BACKGROUND

A liquid crystal display panel includes an array substrate, a counter substrate and a liquid crystal layer positioned between the array substrate and the counter substrate. In the manufacturing process of the liquid crystal display panel, a liquid crystal amount between the array substrate and the counter substrate is controlled to adjust a cell gap (CG) of liquid crystal between the array substrate and the counter substrate, so that the optical characteristics of the liquid crystal display panel are controlled. In order to maintain the uniformity of the cell gap throughout the liquid crystal display panel, spacers are generally disposed between the array substrate and the counter substrate to maintain the cell gap and maintain the uniformity of the cell gap.

SUMMARY

The present disclosure provides a display panel and a display device.

The present disclosure provides a display panel, including: an array substrate and a counter substrate that are opposite to each other, and a spacer group between the array substrate and the counter substrate, the spacer group including:

a first spacer on the array substrate, wherein an orthographic projection of the first spacer on the array substrate is a first pattern extending along a first direction;

a second spacer on the counter substrate, wherein an orthographic projection of the second spacer on the array substrate is a second pattern extending along a second direction, and the first pattern intersects with the second pattern;

at least two third spacers, orthographic projections of the at least two third spacers on the array substrate being respectively on two sides of the first pattern along the first direction; and at least two fourth spacers, orthographic projections of the at least two fourth spacers on the array substrate being respectively on two sides of the second pattern along the second direction, wherein one of the third spacer and the fourth spacer is on the array substrate, and the other of the third spacer and the fourth spacer is on the counter substrate; a size of the third spacer in the second direction is larger than a size of the first spacer in the second direction, and a size of the fourth spacer in the first direction is larger than a size of the second spacer in the first direction.

In some embodiments, the first spacer and the second spacer are both made of flexible materials and are in pressing contact; and one of the third spacer and the fourth spacer, which is on the counter substrate, has a height greater than a height of the second spacer that is pressed; and/or one of the third spacer and the fourth spacer, which is on the array substrate, has a height greater than a height of the first spacer that is pressed.

In some embodiments, the third spacer is on the array substrate and connected with the first spacer to form one piece; and the fourth spacer is on the counter substrate and connected with the second spacer to form one piece.

In some embodiments, orthographic projections of the third and fourth spacers on the array substrate include at least one of a polygon, a circle, and an ellipse.

In some embodiments, the orthographic projection of the third spacer on the array substrate is in a strip shape extending along the second direction, and the orthographic projection of the fourth spacer on the array substrate is in a strip shape extending along the first direction.

In some embodiments, the at least two third spacers are on the counter substrate and spaced apart from the second spacer; and the at least two fourth spacers are on the array substrate and spaced apart from the first spacer.

In some embodiments, the orthographic projection of the third spacer on the array substrate is in a strip shape extending along the second direction, and the orthographic projection of the fourth spacer on the array substrate is in a strip shape extending along the first direction.

In some embodiments, a closest distance between the second and third spacers is less than a length of the first spacer, and a closest distance between the first and fourth spacers is less than a length of the second spacer.

In some embodiments, the spacer group includes two third spacers and two fourth spacers, a distance between a center of the second spacer and a center of each of the two third spacers is equal to the length of the first spacer; and a distance between a center of the first spacer and a center of each of the two fourth spacers is equal to the length of the second spacer.

In some embodiments, the first and second spacers are equal in length.

In some embodiments, the first direction is perpendicular to the second direction.

In some embodiments, a black matrix is disposed on the counter substrate, and an orthogonal projection of the spacer group on the array substrate is within an orthogonal projection of the black matrix on the array substrate.

The embodiments of the present disclosure further provide a display device, which includes the display panel in the above embodiments.

BRIEF DESCRIPTION OF THE DRAWINGS

The accompanying drawings, which are included to provide a further understanding of the present disclosure and constitute a part of this specification, serve to explain the present disclosure together with the following specific embodiments, but do not constitute a limitation of the present disclosure. In the drawings:

FIG. 12B is a schematic diagram illustrating sizes of the spacer group in

FIG. 11.

DETAILED DESCRIPTION

The following detailed description of the embodiments of the present disclosure refers to the accompanying drawings. It should be understood that the detailed description and specific examples, while indicating the present disclosure, are given by way of illustration and explanation only, not limitation.

To make the objects, technical solutions and advantages of the embodiments of the present disclosure more apparent, the technical solutions of the embodiments of the present disclosure will be clearly and completely described below with reference to the drawings of the embodiments of the present disclosure. Obviously, the described embodiments are only a part of the embodiments of the present disclosure, and not all embodiments. All other embodiments, which can be derived by a person skilled in the art from the described embodiments of the present disclosure without creative effort, are within the scope of protection of the present disclosure.

The terminology used herein to describe embodiments of the present disclosure is not intended to limit and/or define the scope of the present disclosure. For example, unless otherwise defined, technical or scientific terms used herein shall have the ordinary meaning as understood by one of ordinary skill in the art to which this disclosure belongs. It should be understood that the terms "first", "second", and the like, as used in this disclosure, do not denote any order, quantity, or importance, but rather are used to distinguish one element from another. The singular forms "a", "an", "the" and the like do not denote a limitation of quantity, but rather denote the presence of at least one, unless the context clearly dictates otherwise. The word "include", "comprise", or the like, means that the element or item appearing in front of the word "include" or "comprise" encompasses the element or item listed after the word "include" or "comprise" and its equivalents, and does not exclude other elements or items. The terms "upper", "lower", "left", "right", and the like are used merely to indicate relative positional relationships, which may also change accordingly when the absolute position of the object being described changes.

Figure 1:
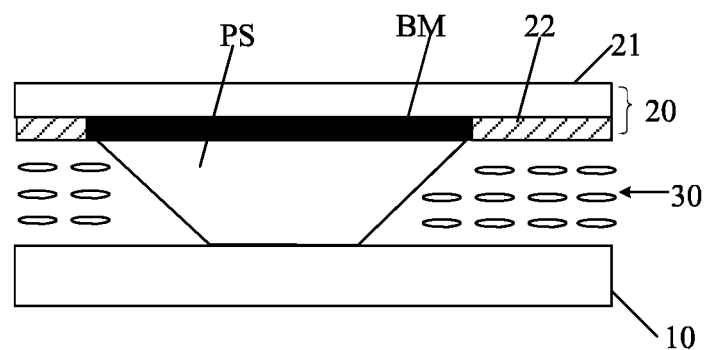
FIG. 1 is a partial cross-sectional view of a display panel provided in an example.
Figure 2:
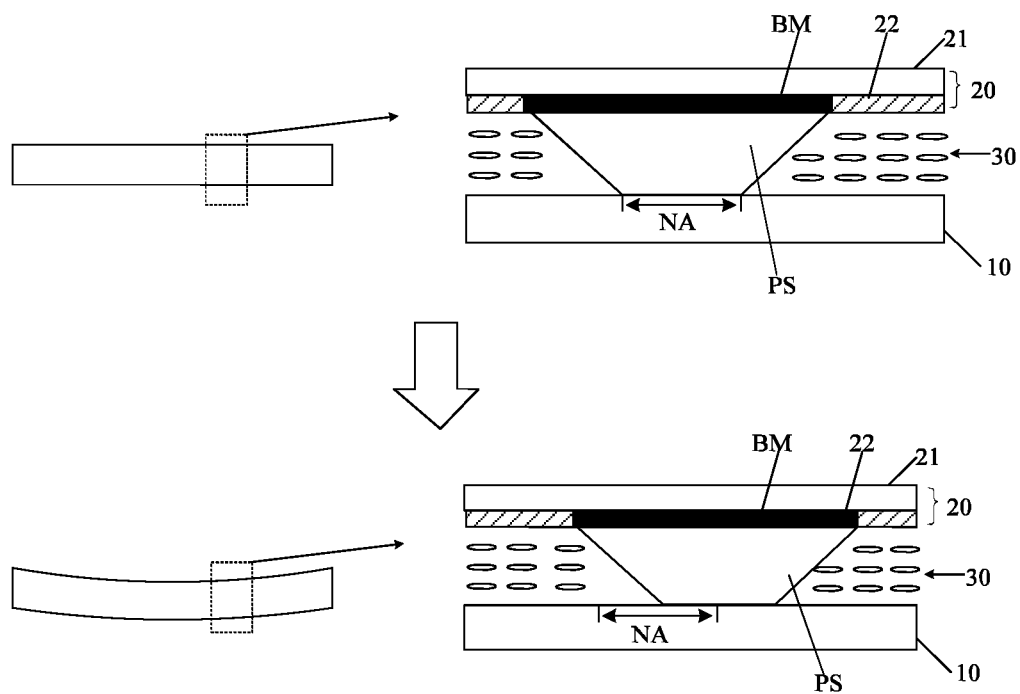
FIG. 2 is a schematic diagram illustrating a change of the display panel in FIG. 1 from an initial state to a bent state.

FIG. 1 is a partial cross-sectional view of a display panel provided in an example. As shown in FIG. 1, the display panel includes an array substrate 10, a counter substrate 20, and a liquid crystal layer 30 therebetween. The array substrate 10 includes a thin film transistor, a pixel electrode, a common electrode, and the like disposed on a first substrate, and the pixel electrode is disposed in each pixel. The counter substrate 20 includes a color filter layer 22, a black matrix BM, and the like disposed on a second substrate 21. The common electrode may also be disposed on the second substrate 21. When an electric field is applied between the pixel electrode and the common electrode, the liquid crystal molecules are deflected under the driving of the electric field, so as to adjust light output of a corresponding pixel. Alignment films (not shown) for anchoring alignment of the liquid crystal molecules of the liquid crystal layer 30 are further provided on the counter substrate 20 and the array substrate 10. The counter substrate 20 is further provided with a spacer PS on a side facing the array substrate 10 to maintain the cell gap of the display panel. The spacer PS is located between two alignment layers, and the spacer PS is located in a region where a black matrix BM is located, and the region does not perform display. In an initial state (i.e., when the display panel is not subjected to an external force), the spacer PS is in a compressed state with a certain compression ratio, thereby maintaining the cell gap and maintaining uniformity of the cell gap. FIG. 2 is a schematic diagram illustrating a change of the display panel in FIG. 1 from the initial state to a bent state. As shown in FIG. 2, when the display panel is bent by an external force, the array substrate 10 and the counter substrate 20 are misaligned in a partial area, and the spacer in the compressed state leave an initial position NA to enter an active display area, and scratch the alignment film on the surface of the array substrate 10. The damaged alignment film may affect the anchoring alignment of the liquid crystal molecules, thereby causing display defects such as light leakage, color unevenness and the like.

Figure 3:
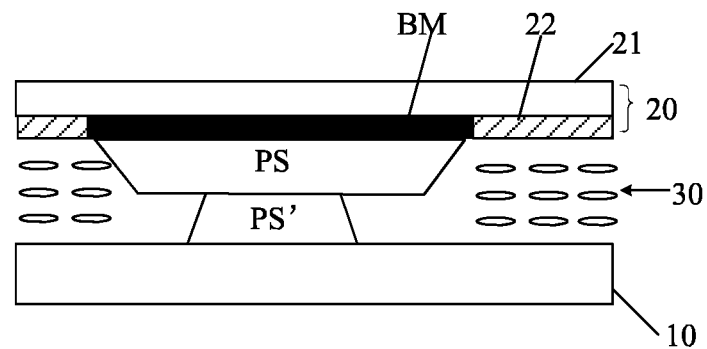
FIG. 3 is a partial cross-sectional view of a display panel provided in another example.
Figure 4:
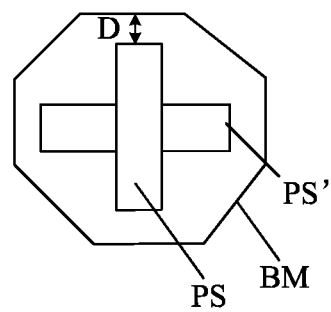
FIG. 4 is a schematic plan view of a spacer in FIG. 3.

FIG. 3 is a partial cross-sectional view of a display panel provided in another example, and FIG. 4 is a schematic plan view of a spacer in FIG. 3. As shown in FIG. 3, spacers PS and PS' are respectively disposed on the array substrate 10 and the counter substrate 20. Compared with the structure shown in FIG. 1, in FIG. 3, a distance between the spacer PS on the counter substrate 20 and the array substrate 10 is increased, and a certain distance also exists between the spacer PS' on the array substrate 10 and the counter substrate 20. In addition, as shown in FIG. 4, the spacer PS on the counter substrate 20 and the spacer PS' on the array substrate 10 are arranged to intersect with each other, so that the phenomenon that the spacer PS/PS' scratches the alignment film on an opposite side can be reduced.

Figure 5:
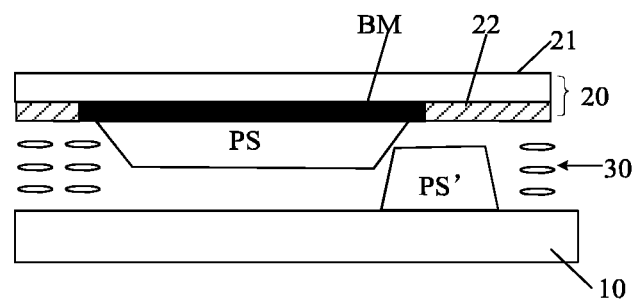
FIG. 5 is a schematic diagram illustrating an array substrate and a counter substrate of the display panel shown in FIG. 3 are partially misaligned.
Figure 6:
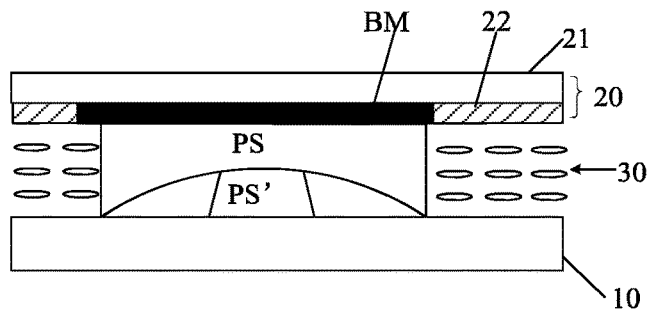
FIG. 6 is a schematic diagram illustrating a partial area of the display panel shown in FIG. 3 is squeezed vigorously.

However, when the display panel is subjected to a large external force, the spacer PS/PS still scratches the alignment layer. FIG. 5 is a schematic diagram illustrating an array substrate and a counter substrate of the display panel shown in FIG. 3 are partially misaligned, and FIG. 6 is a schematic diagram illustrating a partial area of the display panel shown in FIG. 3 is squeezed vigorously. As shown in FIG. 5, when the display panel is impacted or bent by a large force, the spacer PS on the counter substrate 20 and the spacer PS' on the array substrate 10 may be completely misaligned, which may cause a scratch to the alignment film(s) on the counter substrate 20 and/or the array substrate 10. As shown in FIG. 6, when the display panel is bent or squeezed, the spacer PS' may be deformed by squeezing to scratch the alignment film.

Figure 7:
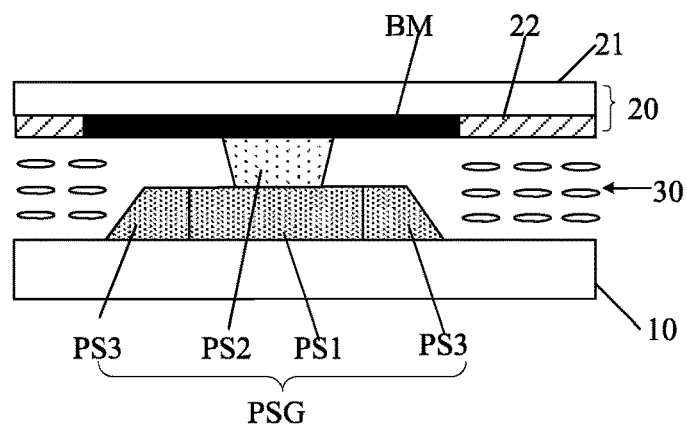
FIG. 7 is a schematic diagram of a display panel provided in some embodiments of the present disclosure.
Figure 8:
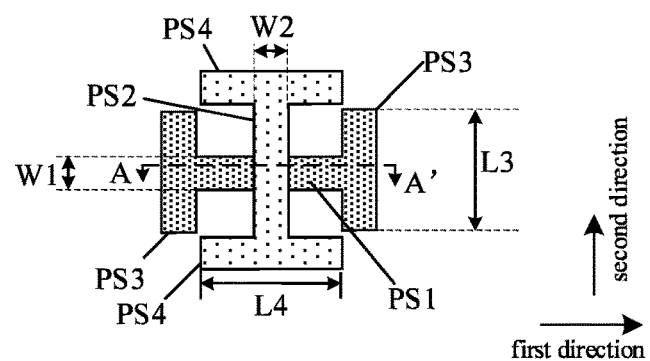
FIG. 8 is a plan view of a spacer group in FIG. 7.
Figure 9:
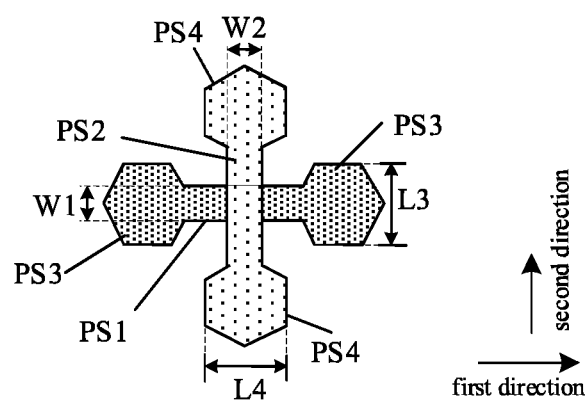
FIG. 9 is another plan view of the spacer group in FIG. 7.

FIG. 7 is a schematic diagram of a display panel provided in some embodiments of the present disclosure, FIG. 8 is a plan view of a spacer group in FIG. 7, and FIG. 9 is another plan view of the spacer group in FIG. 7. FIG. 7 is a cross-sectional view of the display panel, with a section line corresponding to line A-A' in FIG. 8, and other structures except a spacer group are omitted in FIG. 8 in order to clearly show the shape of the spacer group in the display panel. As shown in FIG. 7, the display panel includes: an array substrate 10, a counter substrate 20, a liquid crystal layer 30 and a spacer group PSG. The array substrate 10 and the counter substrate 20 are oppositely arranged, and the array substrate 10 includes structures such as a thin film transistor, a pixel electrode and a common electrode which are arranged on a first substrate. The counter substrate 20 includes structures such as a black matrix, a color filter layer, and a cover layer disposed on a second substrate. The liquid crystal layer 30 and the spacer group PSG are disposed between the array substrate 10 and the counter substrate 20, and the number of the spacer groups PSG may be plural. In some embodiments, an orthographic projection of the spacer group PSG on the array substrate 10 is located within an orthographic projection of a black matrix BM on the array substrate 10.

As shown in FIGS. 7 to 9, the spacer group PSG includes: a first spacer PS1, a second spacer PS2, at least two third spacers PS3 and at least two fourth spacers PS4.

The first spacer PS1 is disposed on the array substrate 10, and an orthographic projection of the first spacer PS1 on the array substrate 10 is a first pattern extending along a first direction. Optionally, the first direction and a second direction are perpendicular to each other. The second spacer PS2 is disposed on the counter substrate 20, and an orthographic projection of the second spacer PS2 on the array substrate 10 is a second pattern extending in the second direction, the first pattern intersecting with the second pattern.

One of the third spacer PS3 and the fourth spacer PS4 is disposed on the array substrate 10, and the other of the third spacer PS3 and the fourth spacer PS4 is disposed on the counter substrate 20. In some embodiments, as shown in FIG. 7, the third spacer PS3 is disposed on the array substrate 10, and the fourth spacer PS4 is disposed on the counter substrate 20. For ease of description, in the embodiment of the present disclosure, the spacers located on the array substrate 10 in a same spacer group PSG are referred to as "array substrate spacer", and the spacers located on the counter substrate 20 in the same spacer group PSG are referred to as "counter substrate spacer". That is, for FIGS. 7 to 9, the array substrate spacer includes the first spacer PS1 and the third spacer PS3, and the counter substrate spacer includes the second spacer PS2 and the fourth spacer PS4.

Orthographic projections of the at least two third spacers PS3 on the array substrate 10 are respectively located on two sides of the first pattern along the first direction, and orthographic projections of the at least two fourth spacers PS4 on the array substrate 10 are respectively located on two sides of the second pattern along the second direction. For example, as shown in FIGS. 7 and 8, the spacer group PSG includes two third spacers PS3, orthographic projections of the two third spacers PS3 on the array substrate 10 are respectively located on two sides of the first pattern, and the two third spacers PS3 and the first pattern are arranged along the first direction; the spacer group PSG includes two fourth spacers PS4, orthographic projections of the two fourth spacers PS4 on the array substrate 10 are respectively located on two sides of the second pattern, and the orthographic projections of the two fourth spacers PS4 on the array substrate 10 and the second pattern are arranged along the second direction.

A size L3 of the third spacer PS3 in the second direction is greater than a size W1 of the first spacer PS1 in the second direction, and a size L4 of the fourth spacer PS4 in the first direction is greater than a size W2 of the second spacer PS2 in the first direction. The sizes W1 and W2 may be set according to the actual requirements of products.

Figure 10:
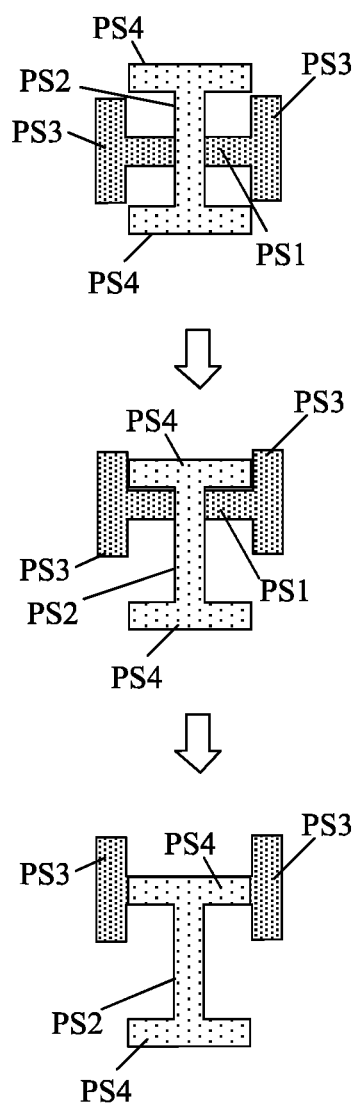
FIG. 10 is a schematic diagram illustrating a change of the spacer group in FIG. 8 when the display panel is bent.

FIG. 10 is a schematic diagram illustrating a change of the spacer group in FIG. 8 when the display panel is bent. As shown in FIG. 10, in an initial state, the orthogonal projection of the first spacer PS1 on the array substrate 10 intersects with the orthogonal projection of the second spacer PS2 on the counter substrate 20, in this case, a contact area between the array substrate spacer and the counter substrate spacer is W1*W2, and when the display panel is bent by an external force, the array substrate and the counter substrate are partially misaligned, so that the array substrate spacer and the counter substrate spacer move relatively. When the second spacer PS2 contacts the third spacer PS3, the contact area between the array substrate spacer and the counter substrate spacer is larger than W1*W2, so that the friction force between the array substrate spacer and the counter substrate spacer is increased, the phenomenon that the array substrate spacer and the counter substrate spacer are completely staggered is reduced or prevented, the phenomenon that the spacer scratches the alignment film on the opposite side is reduced or prevented, and the display effect of the display panel is improved.

In addition, for the display panel shown in FIGS. 1 and 3, since the spacer may leave the original position to scratch the alignment film when the display panel is bent, in FIGS. 1 and 3, a certain distance D (as shown in FIG. 4) needs to be left between the boundary of an area occupied by the black matrix BM and an area occupied by the spacer, so that the area occupied by the black matrix BM is large. In the display panel shown in FIG. 7, since the spacer group PSG can prevent the array substrate spacer and the counter substrate spacer from being completely staggered, the width of the space between the boundary of the area occupied by the black matrix BM and the area occupied by the spacer group PSG can be properly reduced, thereby being beneficial to reducing the area of the black matrix BM and further being beneficial to improving the aperture ratio of the display panel.

In FIG. 10, the case that the array substrate 10 and the counter substrate 20 are relatively displaced in the first direction is explained as an example, and similarly, when the array substrate 10 and the counter substrate 20 are relatively displaced in the second direction, the spacer can be prevented from scratching the alignment film on the opposite side.

In the embodiment of the present disclosure, the first spacer PS1, the second spacer PS2, the third spacer PS3, and the fourth spacer PS4 are all made of a flexible material, and for example, the flexible material is a resin material such as polyimide, polycarbonate, polyacrylate, polyetherimide, polyethersulfone, polyethylene terephthalate, and polyethylene naphthalate. In addition, a plurality of spacer groups PSG in the display panel include at least one main spacer group in which the first and second spacers PS1 and PS2 are in pressing contact, and one of the third and fourth spacers PS3 and PS4, which is located on the counter substrate 20, has a height greater than that of the pressed second spacer PS2; and/or the height of one of the third spacer PS3 and the fourth spacer PS4, which is located on the array substrate 10, is greater than the height of the pressed first spacer PS1, so that when the array substrate 10 and the counter substrate 20 are misaligned, the friction force between the array substrate spacer and the counter substrate spacer is increased. In addition, the plurality of spacer groups PSG in the display panel may further include at least one sub spacer group.

When the display panel is in an initial state, a certain gap may exist between the first spacer PS1 and the second spacer PS2 in the sub spacer group, and when the display panel is bent by an external force, the first spacer PS1 and the second spacer PS2 in the sub spacer group are in pressing contact to support the display panel.

It should be noted that, in the embodiment of the present disclosure, the height of the spacer refers to a size of the spacer in the thickness direction of the display panel.

In the embodiment of the present disclosure, the heights of the first and second spacers PS1 and PS2 may be substantially the same (that is, the height of the unpressed first spacer PS1 is substantially the same as the height of the unpressed second spacer PS2, and the heights of the first and second spacers PS1 and PS2 are substantially the same after the first and second spacers PS1 and PS2 press against each other), and the heights of the third and fourth spacers PS3 and PS4 are substantially the same. This arrangement can prevent the distance between the spacer and the alignment film on the opposite side from being too small, thereby further reducing the possibility that the spacer scratches the alignment film. In the embodiment of the present disclosure, heights of two spacers being substantially the same may specifically means: one of the spacers is 0.9~1.1 times the height of the other spacer. In one specific example, the second spacer PS2 is 0.9 to 1 times the height of the first spacer PS1; the height of one of the third spacer PS3 and the fourth spacer PS4 located on the counter substrate 20 is 0.9 to 1 times the height of the other of the third spacer PS3 and the third spacer PS4 located on the array substrate 10.

In some embodiments, when the third spacer PS3 is disposed on the array substrate 10, the third spacer PS3 and the first spacer PS1 may be formed as one piece; when the fourth spacer PS4 is disposed on the counter substrate 20, the fourth spacer PS4 and the second spacer PS2 may be formed as one piece, so that the structure of the spacer group PSG is more compact, which is beneficial to increase of the area of the active display region.

Of course, when the third spacer PS3 is disposed on the array substrate 10, a certain gap with a width smaller than the size of the second spacer PS2 in the first direction may also be left between the third spacer PS3 and the first spacer PS1 Similarly, when the fourth spacer PS4 is disposed on the counter substrate 20, a certain gap with a width smaller than the size of the first spacer PS1 in the second direction may also be left between the fourth spacer PS4 and the second spacer PS2.

The shapes of the first spacer PS1, the second spacer PS2, the third spacer PS3, and the fourth spacer PS4 are not particularly limited in the embodiments of the present disclosure. In some embodiments, as shown in FIG. 8, the orthographic projection of the third spacer PS3 on the array substrate 10 is in a strip shape extending along the second direction, and the orthographic projection of the fourth spacer PS4 on the array substrate 10 is in a strip shape extending along the first direction. Optionally, the length L3 of the third spacer PS3 is substantially the same as the length of the second spacer PS2, for example, the length L3 of the third spacer PS3 is 1 to 1.2 times the length of the second spacer PS2; the length L4 of the fourth spacer PS4 is substantially the same as the length of the first spacer PS1, for example, the length L4 of the fourth spacer PS4 is 1 to 1.2 times the length of the first spacer PS1. In the embodiment of the present disclosure, the length of each spacer specifically refers to a size of an orthographic projection of the spacer on the array substrate 10 in an extending direction thereof.

Of course, the orthographic projections of the third spacer PS3 and the fourth spacer PS4 on the array substrate 10 may also be in other shapes, for example, as shown in FIG. 9, the orthographic projections of the third spacer PS3 and the fourth spacer PS4 on the array substrate 10 are in the shape of hexagons; or, the orthographic projections of the third spacer PS3 and the fourth spacer PS4 on the array substrate 10 are in the shape of other polygons such as pentagons or octagons, or the orthographic projections of the third spacer PS3 and the fourth spacer PS4 on the array substrate 10 are in the shapes such as circles or ellipses.

Optionally, in FIGS. 8 and 9, the length of the first spacer PS1 is equal to the length of the second spacer PS2; when the display panel is in the initial state, centers of the first spacer PS1 and the second spacer PS2 are substantially aligned, so that when the array substrate 10 and the counter substrate 20 are misaligned in the first direction and the second direction, the spacer can be prevented from scratching the alignment film on the opposite side.

In one example, the size L3 of the third spacer PS3 in the second direction is equal to the size L4 of the fourth spacer PS4 in the first direction.

Figure 11:
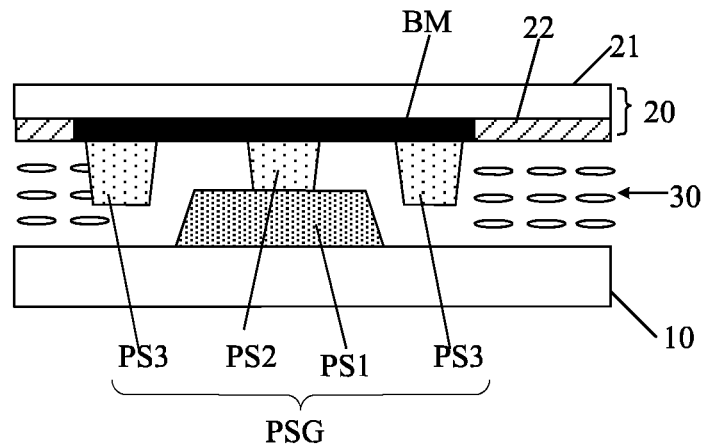
FIG. 11 is a partial cross-sectional view of a display panel provided in some other embodiments of the present disclosure.
Figure 12A:
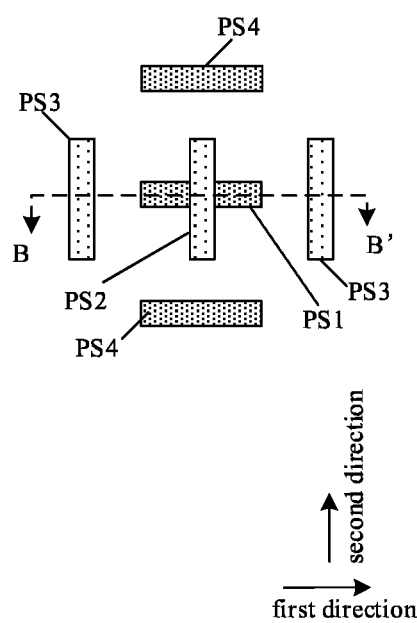
FIG. 12A is a schematic plan view of a spacer group in FIG. 11.
Figure 12B:
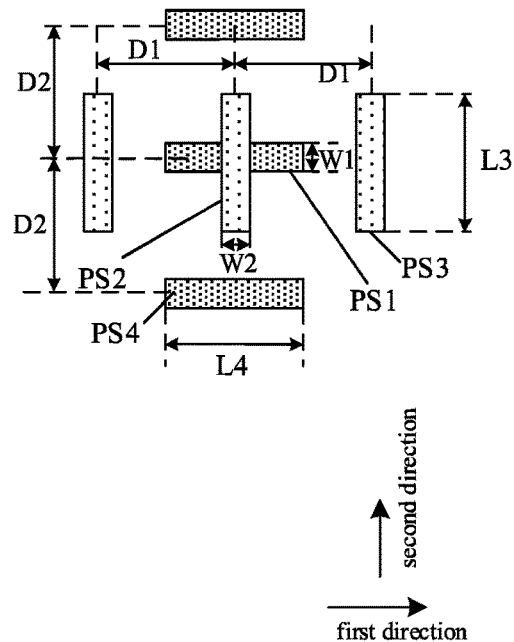

FIG. 11 is a partial cross-sectional view of a display panel provided in other embodiments of the present disclosure, FIG. 12A is a schematic plan view of the spacer group in FIG. 11, and FIG. 12B is a schematic diagram illustrating sizes of the spacer group in FIG. 11. The section line corresponding to FIG. 11 is line B-B' in FIG. 12A, and other structures except the spacer group PSG are omitted in FIG. 12A in order to clearly show the shapes of the spacers. As shown in FIGS. 11 to 12B, the display panel includes: an array substrate 10, a counter substrate 20, a liquid crystal layer 30 and a spacer group PSG, and the spacer group PSG includes: a first spacer PS1, a second spacer PS2, at least two third spacers PS3 and at least two fourth spacers PS4. The first spacer PS1 is disposed on the array substrate 10, and an orthographic projection of the first spacer PS1 on the array substrate 10 is a first pattern extending along a first direction. The second spacer PS2 is disposed on the counter substrate 20, and an orthographic projection of the second spacer PS2 on the array substrate 10 is a second pattern extending in a second direction, the first pattern intersecting with the second pattern. Orthographic projections of the at least two third spacers on the array substrate 10 are respectively located on two sides of the first pattern along the first direction. Orthographic projections of the at least two fourth spacers PS4 on the array substrate 10 are respectively located on two sides of the second pattern along the second direction. A size L3 of the third spacer PS3 in the second direction is greater than a size W1 of the first spacer PS1 in the second direction, and a size L4 of the fourth spacer PS4 in the first direction is greater than a size W2 of the second spacer PS2 in the first direction.

Different from the spacer group in FIG. 8, in FIG. 11, the third spacer PS3 in the spacer group PSG is disposed on the counter substrate 20 and is spaced apart from the second spacer PS2; the fourth spacer PS4 is disposed on the array substrate 10 and is spaced apart from the first spacer PS1. The orthographic projection of the third spacer PS3 on the array substrate 10 is in a strip shape extending in the second direction, and the orthographic projection of the fourth spacer PS4 on the array substrate 10 is in a strip shape extending in the first direction; that is, the third spacer PS3 and the second spacer PS2 are approximately parallel, and the first spacer PS1 and the fourth spacer PS4 are approximately parallel.

In addition, the closest distance between the second spacer PS2 and the third spacer PS3 is smaller than the length of the first spacer PS1, and the closest distance between the first spacer PS1 and the fourth spacer PS4 is smaller than the length of the second spacer PS2.

Figure 13:
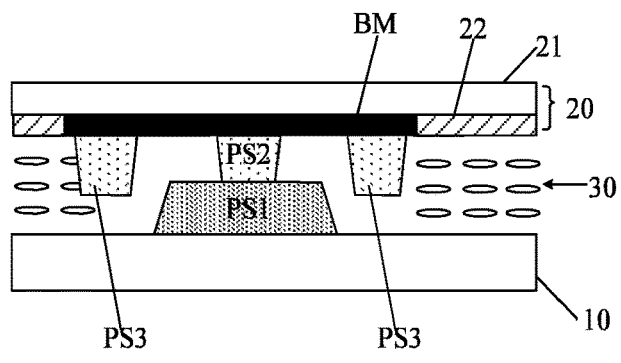
FIG. 13 is schematic cross-sectional views illustrating a change of the spacer group in FIG. 11 when the display panel is bent.
Figure 13:
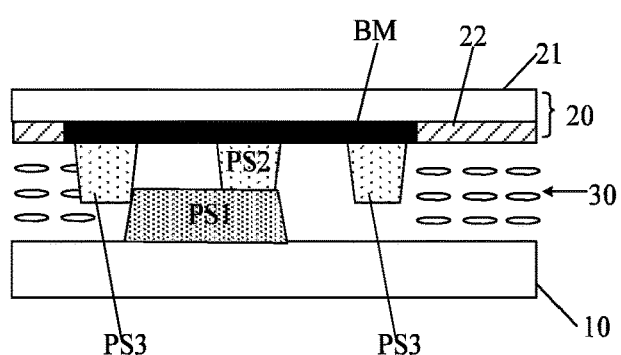
Figure 14:
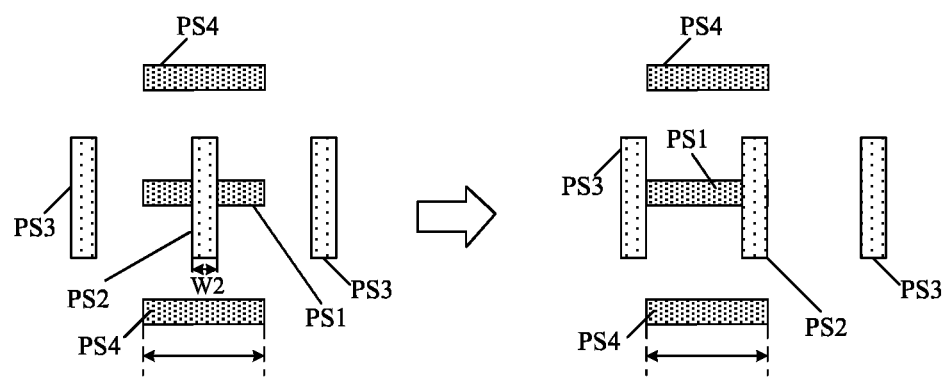
FIG. 14 is schematic plan views illustrating the change of the spacer group in FIG. 11 when the display panel is bent.

FIG. 13 is schematic cross-sectional views illustrating a change of the spacer group in FIG. 11 when the display panel is bent, and FIG. 14 is schematic plan views illustrating the change of the spacer group in FIG. 11 when the display panel is bent. As shown in FIG. 13 and FIG. 14, in an initial state, the first spacer PS1 is in pressing contact with the second spacer PS2; when the display panel is subjected to an external force to cause misalignment between the array substrate 10 and the counter substrate 20, the first spacer PS1 and the second spacer PS2 move relatively, when the first spacer PS1 moves to the position of the third spacer PS3, the third spacer PS3 prevents the continuous displacement of the first spacer PS1, so that the first spacer PS1 is prevented from scratching the alignment film on the counter substrate 20, and the closest distance between the second spacer PS2 and the third spacer PS3 is smaller than the length of the first spacer PS1. As a result, the second spacer PS2 is supported by the first spacer PS1 and thus does not scratch the alignment film on the array substrate 10.

In FIG. 13, the case that the array substrate 10 and the counter substrate 20 are relatively displaced in the first direction is explained as an example, and similarly, when the array substrate 10 and the counter substrate 20 are relatively displaced in the second direction, the fourth spacer PS4 may block the second spacer PS2, and can also prevent the spacer from scratching the alignment film on the opposite side.

In some embodiments, the spacer group PSG includes two third spacers PS3 and two fourth spacers PS4, the distances between the center of the second spacer PS2 and the centers of the two third spacers PS3 are equal, and the distances between the center of the first spacer PS1 and the centers of the two fourth spacers PS4 are equal. Optionally, the distance D1 between the center of the second spacer PS2 and the center of each third spacer PS3 is equal to the length of the first spacer PS1; the distance D2 between the center of the first spacer PS1 and the center of each fourth spacer PS4 is equal to the length of the second spacer PS2, so that the spacers are prevented from scratching the alignment films on the opposite side, the structure of the spacer group PSG is more compact, and the improvement of the aperture ratio of the display panel is facilitated.

It should be noted that, the distance between the centers of two spacers means the distance between center points of the orthographic projections of the two spacers on the array substrate 10. The center point of the orthographic projection refers to an intersection point between a first central line of the orthographic projection, which extends along the first direction and bisects the orthographic projection, and a second central line of the orthographic projection, which extends along the second direction and bisects the orthographic projection.

As in FIG. 8, in FIG. 12B, the length of the first spacer PS1 and the length of the second spacer PS2 may be equal.

It should be noted that, in the embodiments shown in FIGS. 12A and 12B, the case that the third spacer PS3 and the fourth spacer PS4 are in a strip shape is explained as an example, in some embodiments, the third spacer PS3 and the fourth spacer PS4 may also be in other shapes, for example, the orthographic projections of the third spacer PS3 and the fourth spacer PS4 on the array substrate 10 are circular, elliptical, hexagonal, octagonal, or the like.

It could be understood that the above embodiments are merely exemplary embodiments adopted for describing the principle of the present disclosure, but the present disclosure is not limited thereto. Various variations and improvements may be made by those of ordinary skill in the art without departing from the spirit and essence of the present disclosure, and these variations and improvements shall also be regarded as falling into the protection scope of the present disclosure.

What is claimed is:

1. A display panel, comprising: an array substrate and a counter substrate that are opposite to each other, and a spacer group between the array substrate and the counter substrate, the spacer group comprising:
   a first spacer on the array substrate, wherein an orthographic projection of the first spacer on the array substrate is a first pattern extending along a first direction;
   a second spacer on the counter substrate, wherein an orthographic projection of the second spacer on the array substrate is a second pattern extending along a second direction, and the first pattern intersects with the second pattern;
   at least two third spacers, orthographic projections of the at least two third spacers on the array substrate being respectively on two sides of the first pattern along the first direction; and
   at least two fourth spacers, orthographic projections of the at least two fourth spacers on the array substrate being respectively on two sides of the second pattern along the second direction,
   wherein one of the third spacer and the fourth spacer is on the array substrate, and the other of the third spacer and the fourth spacer is on the counter substrate; a size of the third spacer in the second direction is larger than a size of the first spacer in the second direction, and a size of the fourth spacer in the first direction is larger than a size of the second spacer in the first direction,
   wherein the first spacer and the second spacer are both made of flexible materials and are in pressing contact; and
   one of the third spacer and the fourth spacer, which is on the counter substrate, has a height greater than a height of the second spacer that is pressed; and/or one of the third spacer and the fourth spacer, which is on the array substrate, has a height greater than a height of the first spacer that is pressed.

2. The display panel of claim 1, wherein the third spacer is on the array substrate and connected with the first spacer to form one piece; and the fourth spacer is on the counter substrate and connected with the second spacer to form one piece.

3. The display panel of claim 2, wherein orthographic projections of the third and fourth spacers on the array substrate comprise at least one of a polygon, a circle, and an ellipse.

4. The display panel of claim 2, wherein the orthographic projection of the third spacer on the array substrate is in a strip shape extending along the second direction, and the orthographic projection of the fourth spacer on the array substrate is in a strip shape extending along the first direction.

5. The display panel of claim 1, wherein the at least two third spacers are on the counter substrate and spaced apart from the second spacer; and the at least two fourth spacers are on the array substrate and spaced apart from the first spacer.

6. The display panel of claim 5, wherein the orthographic projection of the third spacer on the array substrate is in a strip shape extending along the second direction, and the orthographic projection of the fourth spacer on the array substrate is in a strip shape extending along the first direction.

7. The display panel of claim 6, wherein a closest distance between the second and third spacers is less than a length of the first spacer, and a closest distance between the first and fourth spacers is less than a length of the second spacer.

8. The display panel of claim 7, wherein the spacer group comprises two third spacers and two fourth spacers, a distance between a center of the second spacer and a center of each of the two third spacers is equal to the length of the first spacer; and a distance between a center of the first spacer and a center of each of the two fourth spacers is equal to the length of the second spacer.

9. The display panel of claim 1, wherein the first and second spacers are equal in length.

10. The display panel of claim 1, wherein the first direction is perpendicular to the second direction.

11. The display panel of claim 1, wherein a black matrix is disposed on the counter substrate, and an orthogonal projection of the spacer group on the array substrate is within an orthogonal projection of the black matrix on the array substrate.

12. A display device, comprising the display panel of claim 1.

13. The display panel of claim 1, wherein the first and second spacers are equal in length.

14. The display panel of claim 1, wherein the first direction is perpendicular to the second direction.

15. The display panel of claim 1, wherein a black matrix is disposed on the counter substrate, and an orthogonal projection of the spacer group on the array substrate is within an orthogonal projection of the black matrix on the array substrate.

* * * * *